(12) United States Patent
Kim et al.

(10) Patent No.: US 8,933,891 B2
(45) Date of Patent: Jan. 13, 2015

(54) TERMINAL AND METHOD OF CONTROLLING TERMINAL

(75) Inventors: Taehun Kim, Seoul (KR); Kwang Ho Eom, Seoul (KR); Jonghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1458 days.

(21) Appl. No.: 12/041,445

(22) Filed: Mar. 3, 2008

(65) Prior Publication Data

US 2008/0218490 A1 Sep. 11, 2008

(30) Foreign Application Priority Data

Mar. 2, 2007 (KR) .......... 10-2007-0020731
Apr. 10, 2007 (KR) .......... 10-2007-0035024

(51) Int. Cl.
  *G06F 3/041* (2006.01)
  *G06F 3/0488* (2013.01)
  *H04M 1/725* (2006.01)

(52) U.S. Cl.
  CPC .......... *G06F 3/04883* (2013.01); *G06F 3/0488* (2013.01); *H04M 1/72547* (2013.01)
  USPC .......... 345/173; 345/156; 345/157; 715/701; 715/702

(58) Field of Classification Search
  CPC .............. G06F 3/016; G06F 2203/014; G06F 2203/015; G06F 3/011; A63F 2300/1037; H04M 1/72547
  USPC .......... 345/156–173; 709/204–206; 710/62–73; 715/702, 863
  See application file for complete search history.

(56) References Cited

U.S. PATENT DOCUMENTS

| 6,639,582 | B1 * | 10/2003 | Shrader .......... 345/156 |
| 7,159,008 | B1 * | 1/2007 | Wies et al. .......... 709/206 |
| 7,647,560 | B2 * | 1/2010 | Macauley et al. .......... 715/758 |
| 7,752,544 | B2 * | 7/2010 | Cheng et al. .......... 715/701 |
| 2002/0163497 | A1 * | 11/2002 | Cunningham et al. .......... 345/156 |
| 2004/0082831 | A1 * | 4/2004 | Kobashikawa et al. .......... 600/38 |
| 2005/0108660 | A1 * | 5/2005 | Cheng et al. .......... 715/863 |
| 2005/0143108 | A1 | 6/2005 | Seo et al. |
| 2005/0181827 | A1 * | 8/2005 | Nieminen-Sundell et al. .......... 455/557 |
| 2005/0235032 | A1 * | 10/2005 | Mason, III .......... 709/204 |
| 2005/0261032 | A1 | 11/2005 | Seo et al. |
| 2006/0041848 | A1 | 2/2006 | Lira |
| 2006/0066569 | A1 * | 3/2006 | Eid et al. .......... 345/156 |
| 2006/0258378 | A1 * | 11/2006 | Kaikuranata .......... 455/466 |
| 2008/0068447 | A1 * | 3/2008 | Mattila et al. .......... 348/14.08 |

FOREIGN PATENT DOCUMENTS

| KR | 10-2005-0067022 A | 6/2005 |
| KR | 10-2006-0047452 A | 5/2006 |
| KR | 10-2007-0023863 A | 3/2007 |

* cited by examiner

*Primary Examiner* — Gregory J Tryder
(74) *Attorney, Agent, or Firm* — Birch, Stewart, Kolasch & Birch, LLP

(57) ABSTRACT

A terminal and a method of controlling the terminal are provided. The method of controlling a terminal receives a touch input while performing real-time communication, and transmits the input data to another party's terminal. Therefore, while performing real-time communication with another party, an operation of user may be transmitted to another party's terminal. Further, after the operation of the user is transmitted to another party's terminal, operation of another party may be fed back from another party's terminal.

18 Claims, 21 Drawing Sheets

TERMINAL AND METHOD OF CONTROLLING TERMINAL

This application claims priority under 35 U.S.C. §119(a) on Patent Applications Nos. 10-2007-0020731 and 10-2007-0035024 filed in Republic of Korea on Mar. 2, 2007 and Apr. 10, 2007, respectively, the entire contents of which are hereby incorporated by reference.

BACKGROUND

1. Field

This document relates to a terminal and a method of controlling the terminal.

2. Related Art

Nowadays, a digital mobile terminal comprises a touch screen in which a user enables to more conveniently input necessary information as well as a character. The touch screen can input user information and display the input information.

However, when the user performs a video call or a messenger function with another party using the mobile terminal having the touch screen, the user may transmit multimedia data such as a picture or an image to the another party's terminal.

In this case, although a receiving terminal receives multimedia data transmitted from a transmitting terminal, another party performing real-time communication cannot be easily recognized reception of the multimedia data, if paying no attention.

Therefore, when multimedia data are transmitted from the transmitting terminal or a touch action is performed while performing real-time communication, a technology in which the receiving terminal can easily recognize this is requested.

Further, nowadays, a game for raising a character by connecting to Internet through a mobile terminal or raising a character existing within the terminal has been appeared.

In the game for raising a character, the user selects the character and raises the character with an interest and true heart, thereby obtaining a pleasure.

However, the game for raising a character is used for simply raising the character and is not used with a different use.

SUMMARY

An aspect of this document is to provide a terminal and a method of controlling the terminal that can output an operation corresponding to a user's touch input.

In one general aspect, a method of controlling a terminal comprises: inputting a user touch while performing real-time communication; and transmitting touch input data of the user to another party's terminal.

The transmitting of touch input data of the user to another party's terminal may comprise transmitting data for instructing a vibration output, a sound output, or a light output of the another party's terminal corresponding to the touch input data to the another party's terminal.

In anther aspect, a method of controlling a terminal comprises: receiving touch input data of another party while performing real-time communication with the another party; and outputting an operation corresponding to the received touch input data of the another party.

The method may further comprise: displaying position information corresponding to the touch input data of another party; inputting a user touch of the position information; and outputting an operation corresponding to touch input data of the user and transmitting an operation output instruction corresponding to the touch input data of the another party to the another party's terminal.

In anther aspect, a terminal comprises: a touch device for receiving a user touch; a communication unit for performing real-time communication with another party's terminal through a communication network, transmitting touch input data from the user to the another party's terminal, and receiving touch input data of the another party from the another party's terminal; an output unit for outputting an operation corresponding to the received touch input data of the another party; and a controller for controlling to transmit touch input data of the user while performing real-time communication to the another party's terminal.

In anther aspect, a method of controlling a terminal comprises: displaying a character having a shape or operation changing according to a user manipulation; and outputting a vibration by interlocking with an operation of the character.

The displaying of a character may comprise displaying a character that is set according to a use pattern of the terminal.

The use pattern of the terminal may comprise requesting a call or transmitting a message to a group, a person, or a phone number registered at a phone book.

The displaying of a character may comprise displaying, when a message is received, if a preset specific word exists in the received message, a character matched to the specific word.

The outputting of a vibration may comprise transmitting a vibration output instruction interlocked with the operation of the character to another party's terminal.

The outputting of a vibration may comprise outputting a vibration of strength matched to the operation of the character.

The displaying of a character may be performed when a hot-key is input.

In anther aspect, a terminal comprises: a display unit for displaying a character; an input unit for setting a shape or an operation of the character; an output unit for outputting a vibration corresponding to the character; and a controller for controlling to display a character having a shape or an operation changing according to a user manipulation and to output a vibration interlocked with the operation of the character.

The terminal may further comprise a communication unit for transmitting a vibration output instruction corresponding to the character to another party's terminal.

The input unit may comprise a hot-key for instructing to output a vibration corresponding to the character, and the controller controls to display a shape or an operation of the character according to an input of the hot-key and to output a vibration corresponding to the character.

BRIEF DESCRIPTION OF THE DRAWINGS

The details of one or more implementations are set forth in the accompanying drawings and the description below.

DETAILED DESCRIPTION

Figure 1:
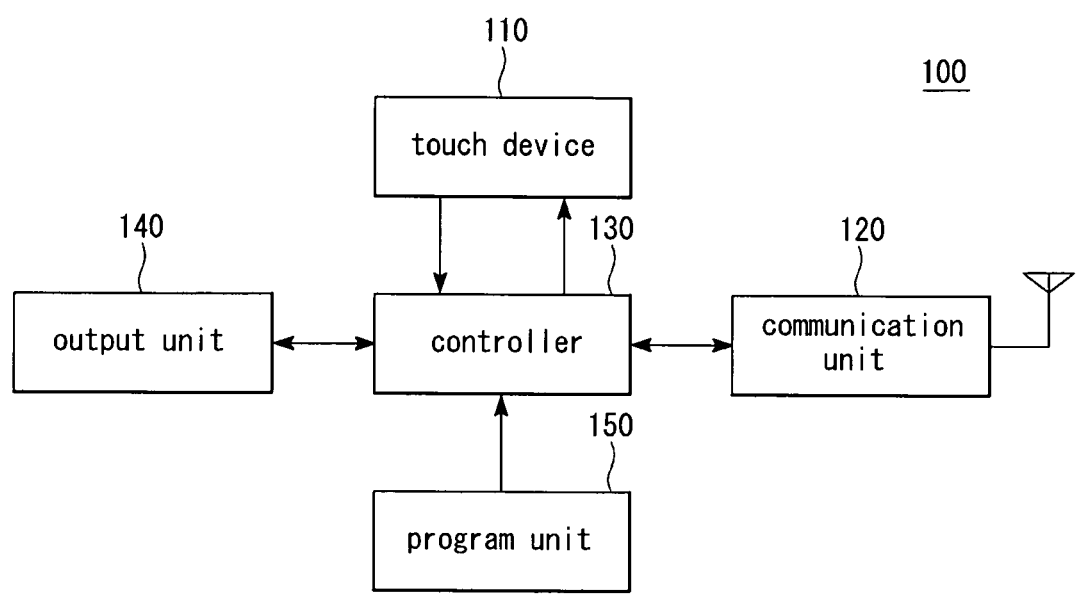
FIG. 1 is a diagram illustrating a configuration of a terminal in an implementation of this document.

Hereinafter, implementations will be described in detail with reference to the accompanying drawings.

In the entire description of this document, like reference numerals represent corresponding parts throughout various figures.

Further, detailed descriptions of well-known functions and structures incorporated herein may be omitted to avoid obscuring the subject matter of this document.

FIG. 1 is a diagram illustrating a configuration of a terminal in an implementation of this document.

A terminal 100 in an implementation of this document comprises a digital mobile terminal comprising a mobile phone or a Personal Digital Assistant (PDA).

Referring to FIG. 1, the terminal 100 comprises a touch device 110, a communication unit 120, a controller 130, an output unit 140, and a program unit 150.

The touch device 110 comprises an indicator area, a display area, an input area, and a control area.

The touch device 110 inputs information or displays the input information with a touch method.

Further, the touch device 110 displays an execution result of an application. In this case, the information comprises a character, a numeral, a symbol, a picture, an image, a sound, and a motion picture.

Further, the touch device 110 receives information or a manipulation instruction from the user through the input area and transmits the information or the manipulation instruction to the controller 130. Further, the touch device 110 displays information through the display area or displays an execution result of an application according to an instruction of the controller 130. The touch device 110 displays a position corresponding to the touch input of the another party received through the communication unit 120.

The communication unit 120 enables the terminal 100 to transmit and receive a sound signal of a phone call and multimedia data with another mobile terminal through a mobile communication network. Further, the communication unit 120 performs real-time communication with another party's terminal and transmits a touch input signal of the user to the another party's terminal.

The communication unit 120 receives a touch input signal of the another party from a mobile communication network.

The controller 130 recognizes information i.e. a shape formed with touched points, received from the touch device 110 and controls to display the information in the display area of the touch device 110.

Further, the controller 130 receives information from the user through the input area and controls to display the information in the display area or performs a control operation of a function and an operation through the control area.

Further, the controller 130 recognizes a touch input of the user through the input area of the touch device 110 while performing real-time communication through the communication unit 120 and controls the communication unit 120 to transmit touch input data from the user to the another party's terminal.

The controller 130 controls the output unit 140 to output an operation corresponding to the touch input data from the user while performing real-time communication. Here, the operation corresponding to the touch input data comprises an operation of outputting a vibration, a sound, or light.

Further, the controller 130 controls to display a shape or an operation of a character according to a use pattern of the terminal in the display area on the touch device 110 and to output a vibration corresponding to a shape or an operation of the character or to transmit a vibration output instruction corresponding to a shape or an operation of the character to the another party's terminal.

Further, when a call is requested or a message is transmitted and received from a group or a person registered at a phone book, the controller 130 controls to display a character feeling according to an operation pattern of the terminal and to output the corresponding character vibration.

Further, when a reception word set by the user is comprised in the received message, the controller 130 controls to display a character feeling on a display screen of the message and to output a character vibration.

The controller 130 controls to output different vibration strength according to a feeling level of the character or to output different vibration strength according to a touch position of a character.

The output unit 140 outputs an operation corresponding to the touch input data. For example, the output unit 140 outputs a vibration, a sound, or light corresponding to the touch input data.

Further, the output unit 140 outputs a vibration corresponding to a character feeling or a vibration corresponding to a touch position of the character.

When a touch input of the user exists while performing real-time communication, the program unit 150 stores a program for transmitting touch input data of the user to the another party's terminal. Further, when a position corresponding to the received touch input data of the another party is displayed and a touch input of the user exists at the display position, the program unit 150 stores an operation feedback program for outputting an operation corresponding to the touch input data of the another party, transmitting the touch input data of the user to the another party's terminal, and outputting an operation corresponding to the touch input data of the user to the another party's terminal.

Further, the program unit 150 stores a program for displaying a shape or an operation of the character according to a use pattern of the terminal on a screen and outputting a vibration corresponding to a shape or an operation of the character or transmitting a vibration output instruction corresponding to a shape or an operation of the character to the another party's terminal. Further, the program unit 150 stores a program for outputting a vibration corresponding to a touch position of the character or outputting a vibration corresponding to a feeling level of the character. The program unit 150 also stores a general Operating System (OS) program.

Figure 2:
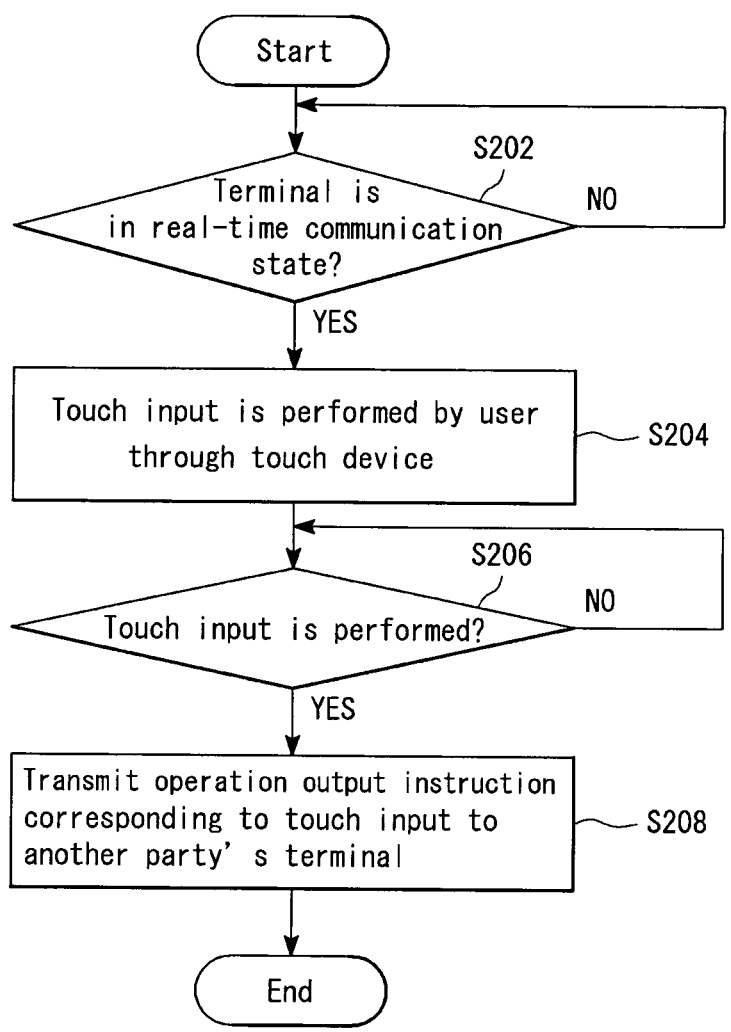
FIG. 2 is a flowchart illustrating a process of operating a transmitting terminal in a method of controlling a terminal in an implementation of this document.

FIG. 2 is a flowchart illustrating a process of operating a transmitting terminal in a method of controlling a terminal in an implementation of this document.

Referring to FIG. 2, the controller 130 determines whether the terminal 100 is in a real-time communication state with another party's terminal through a video call, a messenger, or an instant messenger in a common method (S202).

The controller 130 controls the communication unit 120 to perform real-time communication using a process of transmitting information about a voice or data input by the user to the another party's terminal or receiving information about a voice or data transmitted from the another party's terminal.

If the terminal 100 is in real-time communication with another party's terminal through a video call, a messenger, or an instant messenger, the controller 130 determines whether a touch input is performed by the user through the touch device 110 (S204). Here, the touch input comprises an input by a user touch of a dialogue window, a picture, or a character.

Figure 5:
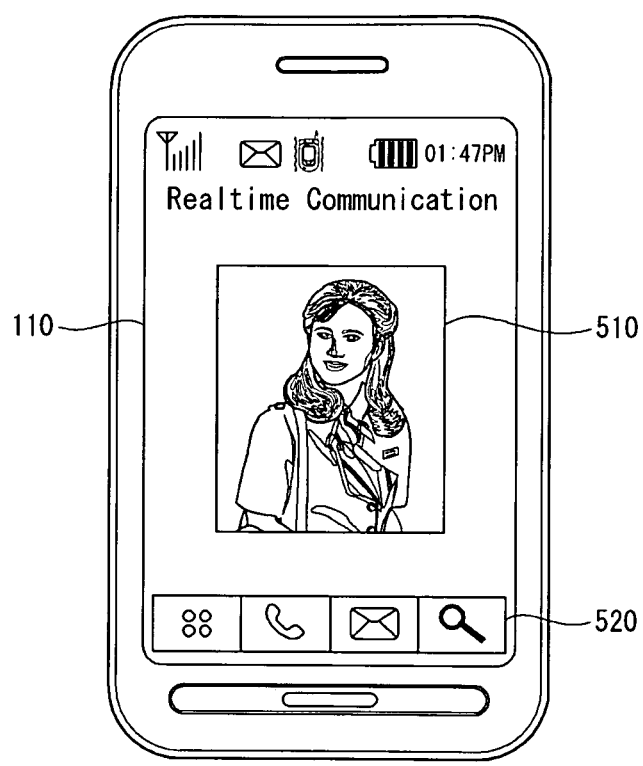
FIG. 5 illustrates an example of simply touching a screen in which another party's face is displayed while performing a video call.

For example, as shown in FIG. 5, the user can touch a screen 510 in which another party's face is displayed on the touch device 110 while performing a video call with the another party through the terminal 100. FIG. 5 illustrates an example of simply touching a screen in which another party's face is displayed while performing a video call.

If a touch input is performed by the user through the touch device 110 (S206), the controller 130 controls the communication unit 120 to transmit an operation output instruction corresponding to the touch input to the another party's terminal (S208).

Here, the operation output instruction comprises an operation of outputting a vibration, a specific sound, or specific light from the terminal 100.

Further, as shown in FIG. 5, a control area 520 is provided at a lower end of the touch device 110 on a screen for performing a video call and real-time communication through a messenger with the another party's terminal. The control area 520 comprises a lower-level menu of currently performing communication. For example, when performing a video call, the control area 520 comprises a menu for transmitting multimedia data such as a picture, an image, and a motion picture to the another party's terminal or a menu for adjusting a communication volume. Further, when performing communication through a messenger, the control area 520 comprises a menu for playing a game with the another party or a menu for inviting the another party.

Figure 6:
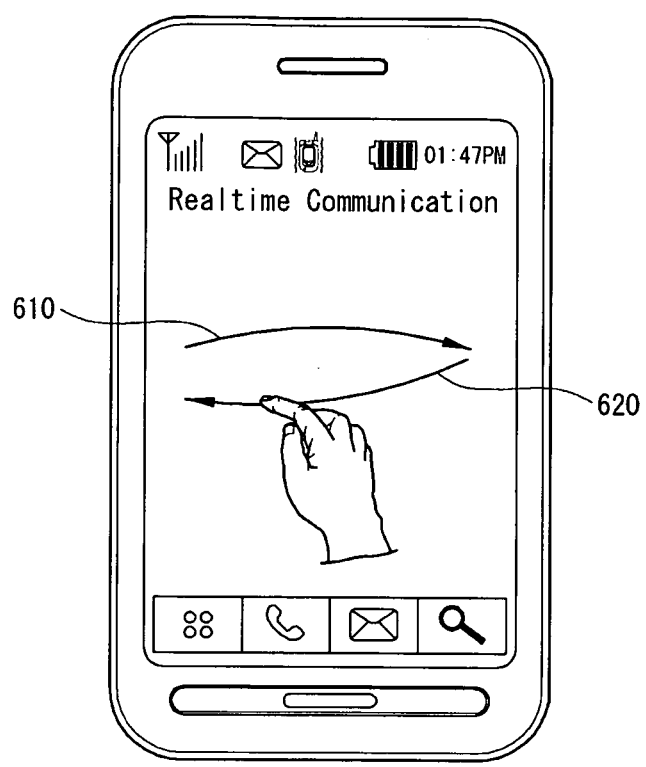
FIG. 6 illustrates an example of dragging after touching a screen in which another party's face is displayed during a predetermined time period while performing a video call.

When the user touches the screen 510 in which the another party's face is displayed on the touch device 110 while performing a video call with the another party through the terminal 100, as shown in FIG. 5, the user can remove his finger from the touch device 110 after dragging by a predetermined distance to the right side 610 or the left side 620 in a state where his finger is touched, as shown in FIG. 6. FIG. 6 illustrates an example of dragging after touching a screen in which another party's face is displayed during a predetermined time period while performing a video call. As shown in FIG. 6, while touching a screen 510 in which the another party's face is displayed, if the user drags his finger to the right side 610 or the left side 620, the touch device 110 transmits data corresponding to the touch input dragged to the right side 610 or the left side 620 by the user to the controller 130.

Accordingly, the controller 130 controls the another party's face that is output on the screen of the touch device 110 to shake to the right side 610 or the left side 620 according to the touch input data dragged to the right side 610 or the left side 620 from the touch device 110. Further, the controller 130 controls the communication unit to transmit the touch input data dragged to the right side 610 or the left side 620 from the touch device 110 to the another party's terminal 120.

Figure 3:
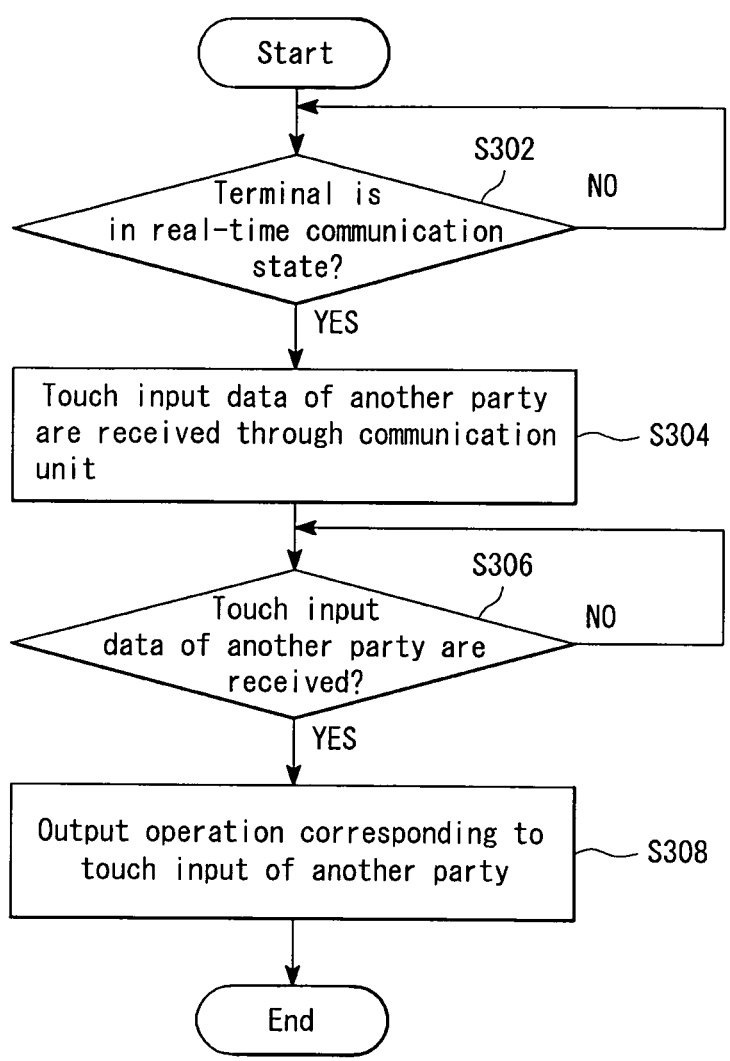
FIG. 3 is a flowchart illustrating a process of operating a receiving terminal in a method of controlling a terminal in an implementation of this document.

FIG. 3 is a flowchart illustrating a process of operating a receiving terminal in a method of controlling a terminal in an implementation of this document.

Referring to FIG. 3, the controller 130 determines whether the terminal 100 is in a real-time communication state with the another party's terminal through a mobile communication network with the same process as that shown in FIG. 2 (S302).

If the terminal 100 is in a real-time communication state with the another party's terminal through a mobile communication network, the controller 130 determines whether touch input data of the another party are received through the communication unit 120 (S304). That is, the controller 130 determines whether data of an operation output instruction corresponding to touch input of the another party are received. In this case, the data of an operation output instruction are packet format data consisting of for example, a header and a payload and may comprise an instruction for outputting a vibration, a specific sound, or specific light to a payload area.

If touch input data of the another party are received through the communication unit 120 (S306), the controller 130 controls the output unit 140 to output an operation corresponding to the touch input of the another party (S308).

That is, the controller 130 controls the output unit 140 to output a vibration, a specific sound, or specific light according to an operation output instruction corresponding to the touch input of the another party.

Figure 7:
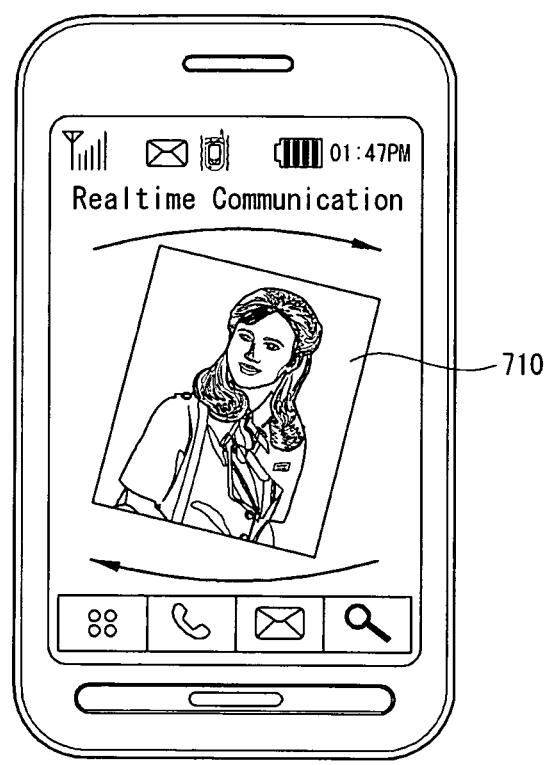
FIG. 7 illustrates an example of a screen shaken to the right side or the left side according to a touch input dragged to the right side or the left side.

Further, when the touch input data of the another party are touch input data dragged to the right side 610 or the left side 620, as shown in FIG. 6, the controller 130 controls to output one of a vibration, a specific sound, and specific light and to shake a screen 710 in which the another party's face, in which the user currently views, is displayed on the touch device 110 to the right side 610 or the left side 620, as shown in FIG. 7. FIG. 7 illustrates an example of a screen shaken to the right side or the left side according to a touch input data dragged to the right side or the left side.

Figure 4:
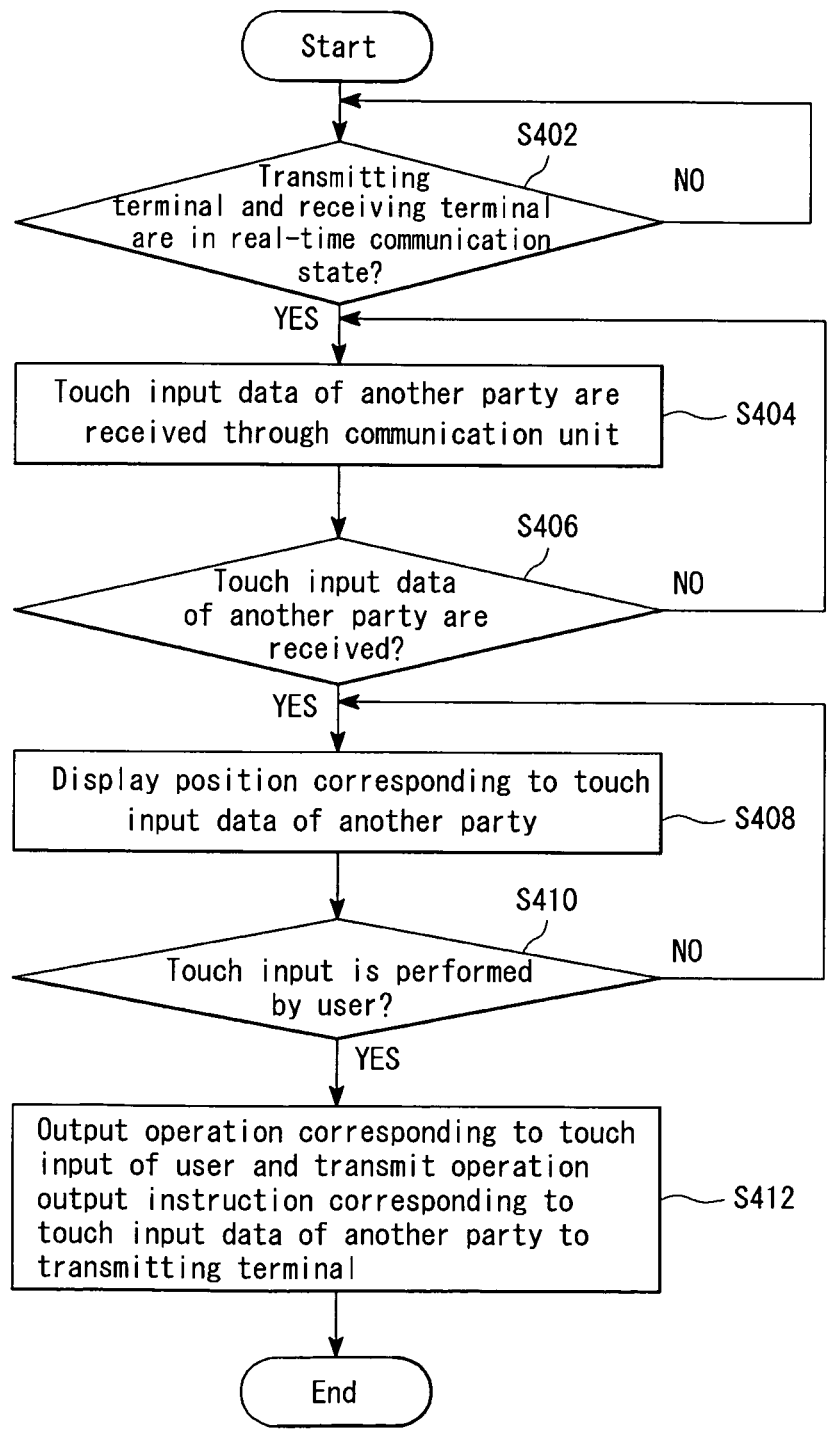
FIG. 4 is a flowchart illustrating a process of feed-backing a user action from a receiving terminal to a transmitting terminal in a method of controlling a terminal in an implementation of this document.

FIG. 4 is a flowchart illustrating a process of feed-backing a user action from a receiving terminal to a transmitting terminal in a method of controlling a terminal in an implementation of this document.

Referring to FIG. 4, the controller 130 determines whether the transmitting terminal and the receiving terminal are in a real-time communication state with the same process as that shown in FIG. 2 (S402).

If the transmitting terminal and the receiving terminal are in a real-time communication state, the controller 130 determines whether the touch input data of the another party are received in the receiving terminal through the communication unit 120 (S404). That is, the controller 130 determines whether data of an operation output instruction corresponding to the touch input data of the another party are received. In this case, the data of an operation output instruction comprise position information in which the another party touches a screen through the touch device 110.

If the touch input data of the another party are received in the receiving terminal through the communication unit 120 with the same process as that shown in FIG. 3 (S406), the controller 130 controls to display a position corresponding to the touch input data of the another party on a screen of the touch device 110 (S408).

In this case, a position indicator corresponding to the touch input data of the another party displayed on the touch device 110 may be displayed and output in a shape such as a cross, a circle, or a square.

Accordingly, the user can check the position indicator displayed on the touch device 110 and touch the position indicator by his finger.

The controller 130 determines whether a touch input to the position indicator is performed by the user (S410).

If touch input to the position indicator is performed by the user, the controller 130 controls the output unit 140 to output an operation corresponding to the user's touch input and the communication unit 120 to transmit an operation output instruction corresponding to the previously received touch input data of the another party to the transmitting terminal (S412).

That is, the controller 130 controls to output an operation, for example a vibration, a specific sound, or specific light corresponding to the user's touch input and to transmit an operation output instruction to apply to the transmitting terminal transmit to the transmitting terminal.

Accordingly, the transmitting terminal outputs a vibration, a specific sound, or specific light according to the operation output instruction received from the receiving terminal.

Therefore, both the transmitting terminal and the receiving terminal simultaneously output a vibration, a sound, or light according to the user's touch input in the receiving terminal. That is, if the transmitting terminal transmits, for example a vibration operation to the receiving terminal, a vibration operation is fed back to the transmitting terminal according to a user touch of the receiving terminal.

As describe above, in this document, by transmitting touch input data of the user to the another party's terminal while performing real-time communication with the another party, a terminal and a method of controlling the terminal that can output an operation corresponding to the touch input data of the user to the another party's terminal can be realized. Further, when receiving the corresponding touch input data of the another party, a terminal and a method of controlling the terminal that can feed back an operation corresponding to the touch input data of the another party to the user terminal can be realized.

Figure 8:
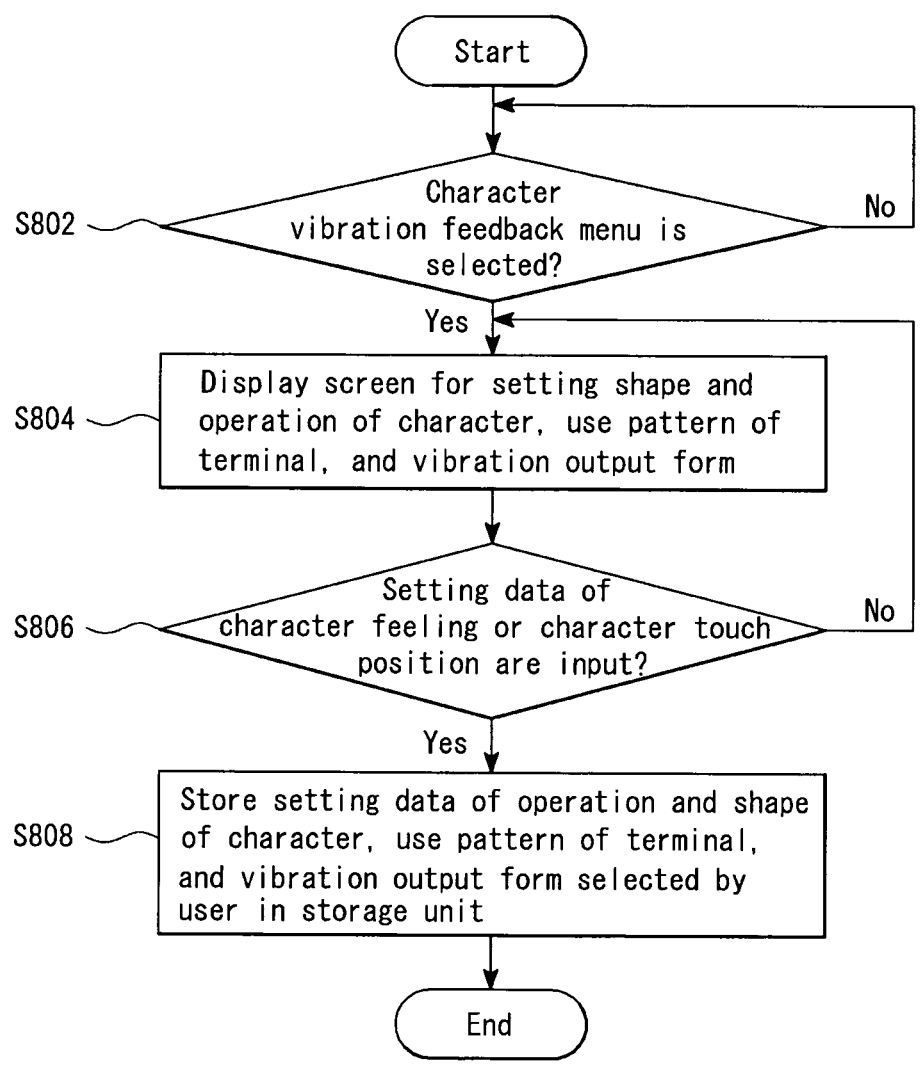
FIG. 8 is a flowchart illustrating a process of setting a character vibration feedback function in a method of controlling a terminal in another implementation of this document.

FIG. 8 is a flowchart illustrating a process of setting a character vibration feedback function in a method of controlling a terminal in another implementation of this document.

Referring to FIG. 8, the controller 130 determines whether a character vibration feedback menu among menus displayed on the touch device 110 of the mobile terminal 100 is selected by the user (S202).

Figure 13:
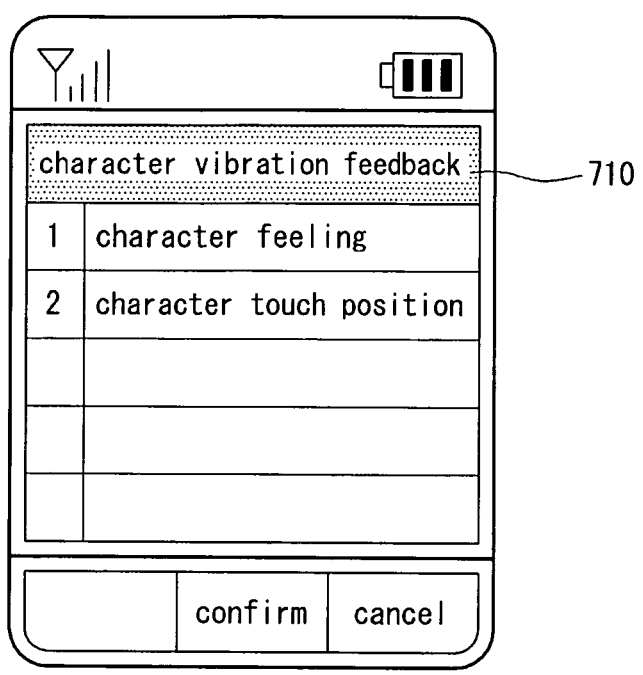
FIG. 13 illustrates a screen for setting a character vibration feedback menu.

If a character vibration feedback menu among menus displayed on the touch device 110 of the mobile terminal 100 is selected by the user, the controller 130 controls to display a screen for setting a shape and an operation of a character, a use pattern of the terminal, and a vibration output form on the touch device 110 (S204). For example, the controller 130 controls to display a lower-level menu of a character vibration feedback menu 710 on the touch device 110, as shown in FIG. 13. FIG. 13 illustrates a screen for setting a character vibration feedback menu. The character vibration feedback menu shown in FIG. 13 comprises a character feeling setting menu and a character touch position setting menu.

Figure 14:
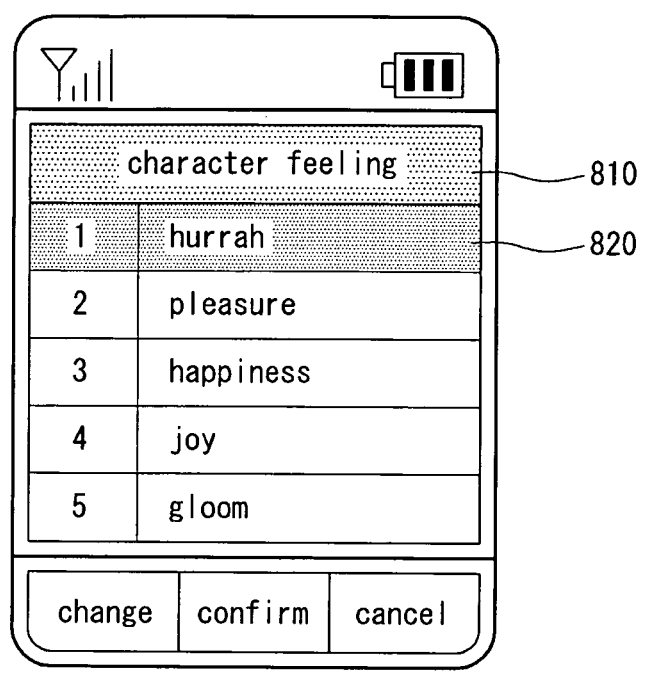
FIG. 14 illustrates a screen for setting a character feeling.

The character feeling setting menu comprises "hurrah" of a best level, "pleasure" of a very good level, "happiness" of a good level, "joy" of a little good level, and "gloom" of no good level, as shown in FIG. 14.

FIG. 14 illustrates a screen for setting a character feeling. The user may select an "hurrah" level 820 of a best level among a character feeling setting menu 810, as shown in FIG. 14.

After setting a character feeling, in order to set a vibration output form corresponding to the set character feeling, the user selects a vibration output setting menu through the touch device 110.

Figure 15:
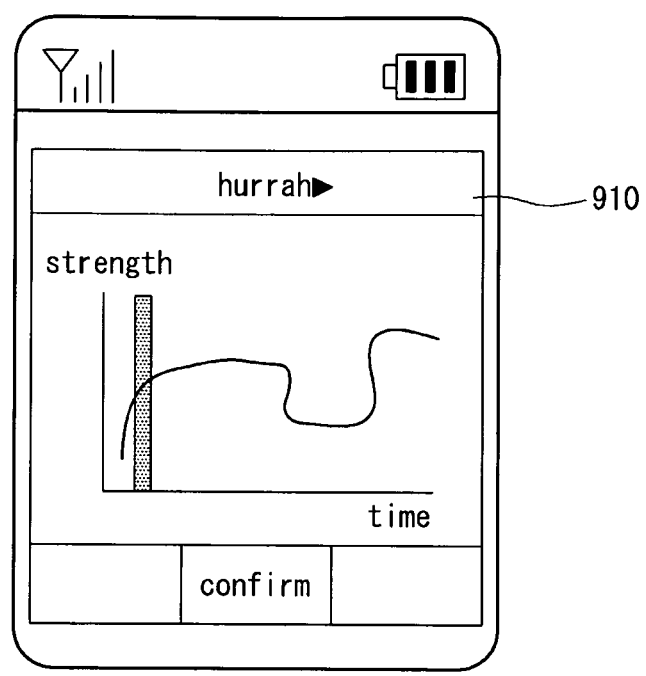
FIG. 15 illustrates a screen for setting a vibration output form to be matched to a character feeling.

When a vibration output setting menu is selected and input on the touch device 110, the controller 130 controls to display a screen for setting a vibration output form on the touch device 110, as shown in FIG. 15. Accordingly, the user selects a vibration output form 910 to be matched to a character feeling among a plurality of vibration output forms provided on the touch device 110.

FIG. 15 illustrates a screen for setting a vibration output form to be matched to a character feeling. The vibration output form shown in FIG. 15 lowers vibration strength for a predetermined section while outputting a vibration in predetermined strength and outputs again a vibration in predetermined strength after the predetermined section.

Figure 16:
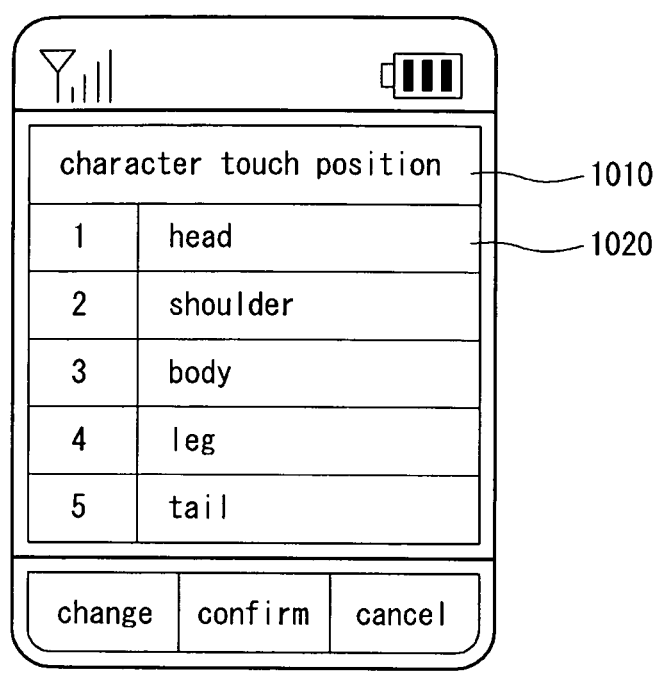
FIG. 16 illustrates a screen for setting a character touch position.

The user can set a character touch position using a character touch position setting menu, as shown in FIG. 16.

FIG. 16 illustrates a screen for setting a character touch position. When the user selects a character touch position setting menu 1010, as shown in FIG. 16, the controller 130 controls to display a menu, such as a head, a shoulder, a body, a leg, and a tail corresponding to a character touch position for setting the character touch position, on the touch device 110. The user touches and inputs, for example a "head" 1020 among many touch positions displayed on the touch device 110 through a touch input, as shown in FIG. 16.

Figure 17:
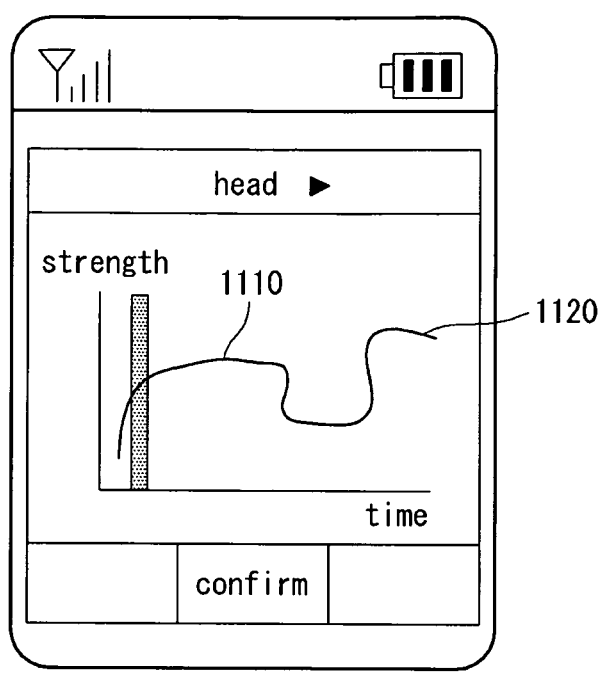
FIG. 17 illustrates a screen for setting a vibration output form corresponding to a character touch position.

When a character touch position is set by a touch input of the user, the controller 130 controls to provide a screen for setting a vibration output form corresponding to the character touch position i.e. the "head" 1020 set by the user on the touch device 110, as shown in FIG. 17.

FIG. 17 illustrates a screen for setting a vibration output form corresponding to a character touch position.

The vibration output form shown in FIG. 17 lowers vibration strength for a predetermined section while outputting a vibration in predetermined strength 1110 and outputs a vibration in strength 1120 higher than previous predetermined strength after the predetermined section.

Further, the controller 130 controls to provide a screen for matching a character feeling or a vibration output form to a use form of a terminal comprising a function of setting the above-described character feeling or character touch position and of requesting a call or transmitting and receiving a message. Accordingly, the user can input setting data for matching a character feeling or a vibration output form to a function of requesting a call or transmitting and receiving a message through the touch device 110.

Figure 18:
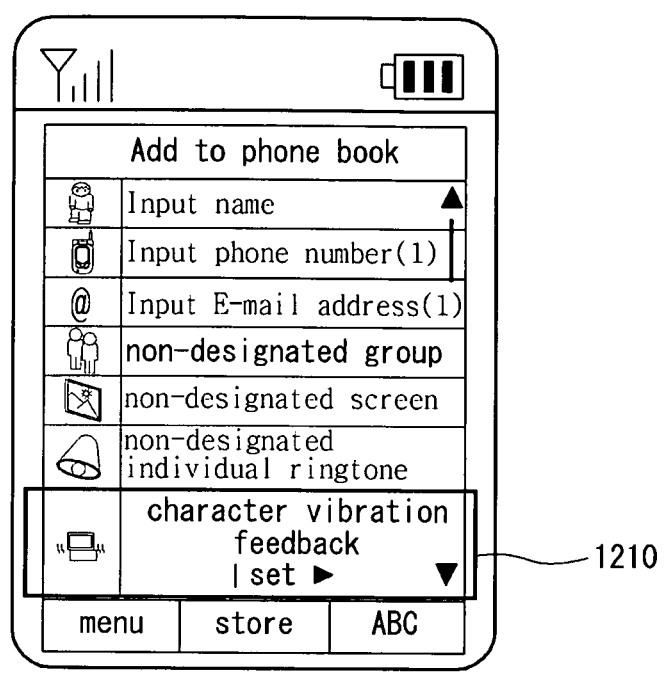
FIG. 18 illustrates a screen for setting character vibration feedback to a call request function.

FIG. 18 illustrates a screen for setting character vibration feedback to a call request function. When the user selects a phone book menu among menus, as shown in FIG. 18, the controller 130 provides the phone book menu on the touch device 110. The phone book menu is a menu for adding a phone number and comprises a menu for inputting a name, a phone number, and an E-mail address or a menu for designating a group, designating an individual ringtone, and setting character vibration feedback. The user can set a character vibration feedback to a call request function by setting a character vibration feedback 1210 to any phone number selected from the phone book or to a newly added phone number, as shown in FIG. 18.

Figure 19:
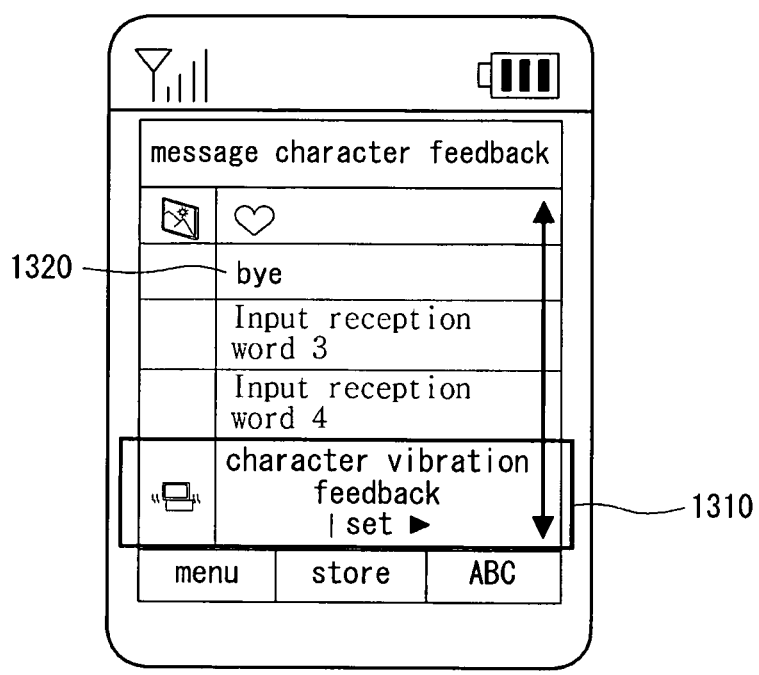
FIG. 19 illustrates a screen for setting character vibration feedback to a message reception function.

FIG. 19 illustrates a screen for setting a character vibration feedback to a message reception function. When the user selects a message character feedback menu among menus, as shown in FIG. 19, the controller 130 controls to display a message character feedback setting screen on the touch device 110, as shown in FIG. 19. The character feedback setting screen shown in FIG. 19 comprises a column for inputting a "reception word" for determining whether a "reception word" requested by the user exists in a reception message and a character vibration feedback setting menu 1210 for setting a character vibration feedback to the input "reception word".

By selecting a character vibration feedback setting menu 1310 after inputting a "reception word" 1320, as shown in FIG. 19, the user can set a character vibration feedback to a message reception function.

If setting data of a character feeling or a character touch position are input with the above-described process (S206), the controller 130 controls a storage unit (not shown) to store setting data of an operation and a form of a character, a use pattern of the terminal, and a vibration output form selected by the user (S208).

Figure 9:
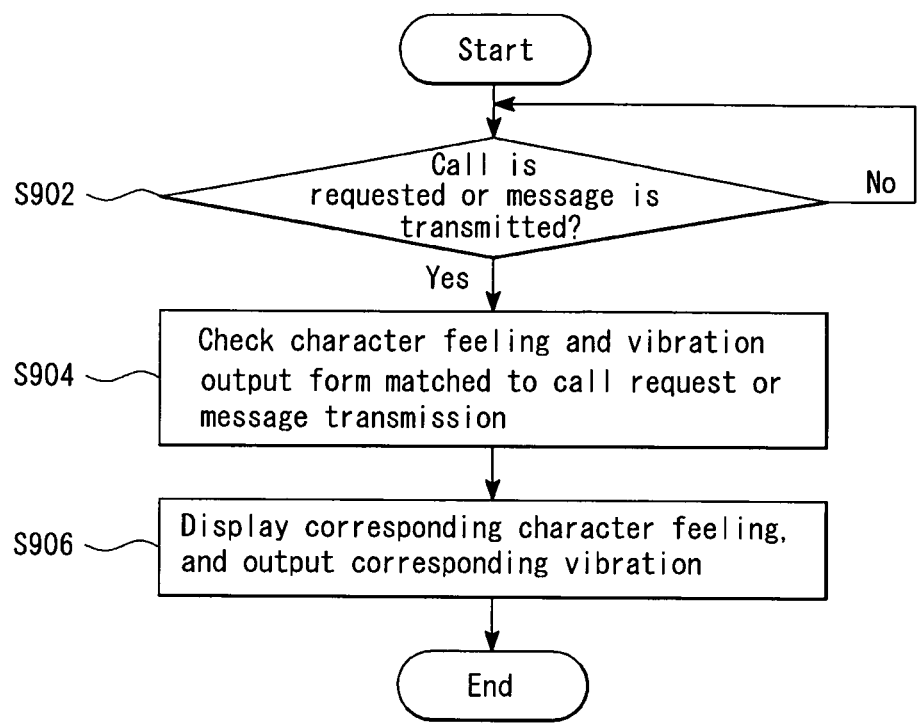
FIG. 9 is a flowchart illustrating a method of controlling a terminal in another implementation of this document.

FIG. 9 is a flowchart illustrating a method of controlling a terminal in another implementation of this document.

Referring to FIG. 9, in another implementation of this document, as a use pattern of the terminal, the user applies a character vibration output to a function of requesting a call or transmitting a message.

When the user selects any phone number from a phone book displayed on the touch device 110, the controller 130 determines whether a call is requested or a message is transmitted to the selected phone number (S902).

If a call is requested or a message is transmitted to the selected phone number, the controller 130 checks a character feeling and a vibration output form matched to the call request or the message transmission (S904).

That is, the controller 130 searches for and checks data of a character feeling and a vibration output form matched to the call request or the message transmission among setting data stored in the storage unit.

In this case, when a use pattern of the terminal is a call request, the controller 130 controls to search for a phone number to request a call in the storage unit, to check a character feeling and a vibration output form corresponding to the found phone number, to display the corresponding character feeling on the touch device 110, and to output the corresponding vibration through the output unit 140 (S906), as shown in FIG. 15.

Figure 20:
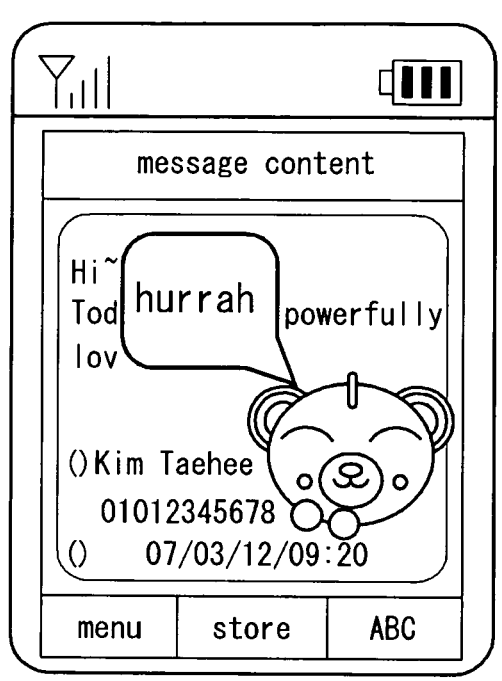
FIG. 20 illustrates a screen for displaying a character feeling when transmitting and receiving a message.

Further, when a use pattern of the terminal is message transmission, the controller 130 controls to search for a phone number to transmit in the storage unit, to check a character feeling and a vibration output form corresponding to the found phone number, to display a character feeling on the touch device 110, as shown in FIG. 20, and to transmit a vibration output instruction having the vibration output form of FIG. 15 to the another party's terminal.

FIG. 20 illustrates a screen for displaying a character feeling when transmitting and receiving a message.

When a "reception word" set by the user exists in the received message, the controller 130 controls to display a character feeling corresponding to the "reception word" on the touch device 110, as shown in FIG. 20.

Figure 10:
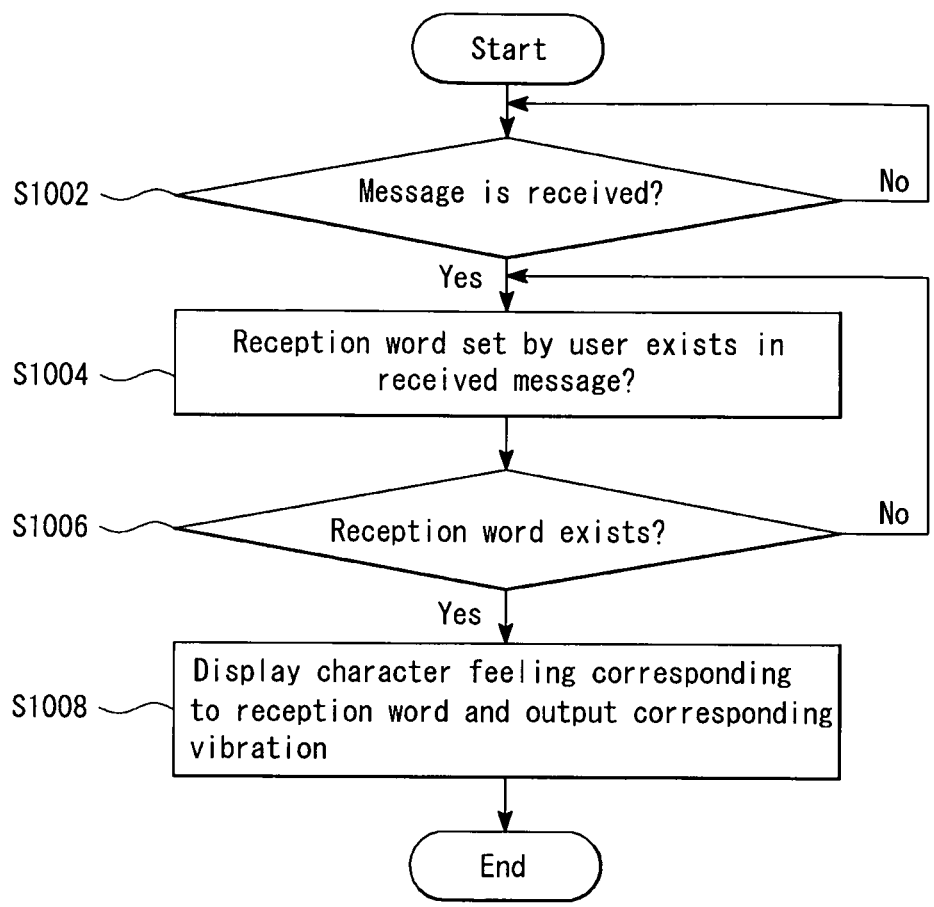
FIG. 10 is a flowchart illustrating a method of controlling a terminal in another implementation of this document.

FIG. 10 is a flowchart illustrating a method of controlling a terminal in another implementation of this document.

Referring to FIG. 10, in another implementation of this document, as a use pattern of the terminal, when a message is received, a character vibration is output.

The controller 130 determines whether a message such as a Short Message Service (SMS) or a multimedia message is received from the another party's terminal through the communication unit 120 (S1002).

If a message such as an SMS or a multimedia message is received from the another party's terminal through the communication unit 120, the controller 130 determines whether a reception word set by the user exists in the received message with the above-described process (S1004).

If a reception word set by the user exists in the received message (S1006), the controller 130 controls to display a character feeling corresponding to the reception word on the touch device 110 and the output unit 140 to output the corresponding vibration (S1008).

Figure 11:
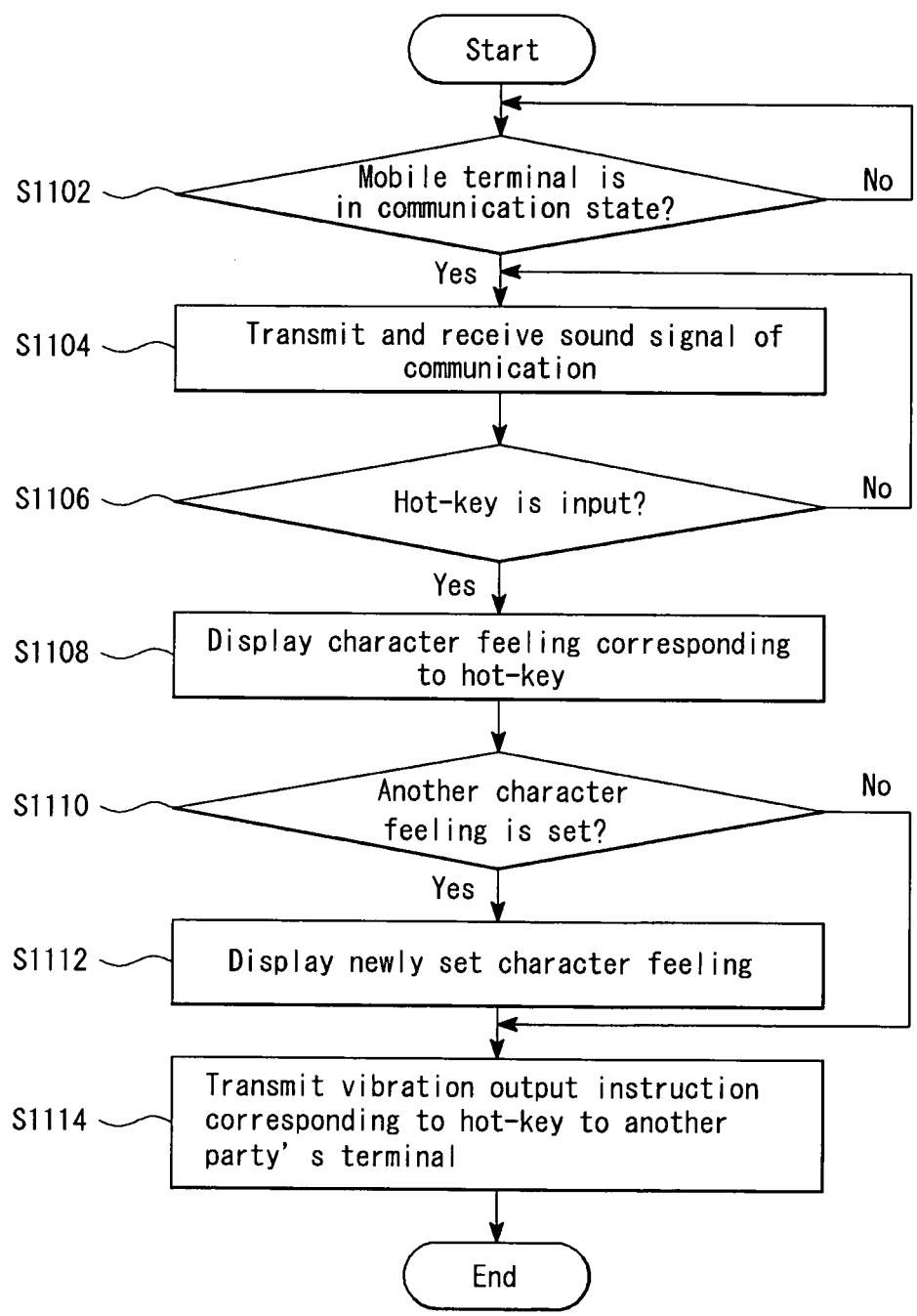
FIG. 11 is a flowchart illustrating a method of controlling a terminal in another implementation of this document.

FIG. 11 is a flowchart illustrating a method of controlling a terminal in another implementation of this document.

Referring to FIG. 11, in another implementation of this document, while a use pattern of the terminal, when the user communicates with another party, a character vibration is output.

After the user inputs another party's phone number to the mobile terminal 100 and requests a call to the another party's terminal, the mobile terminal 100 connects a call to the another party's terminal. The controller 130 determines whether the mobile terminal 100 is in a communication state with the another party's terminal (S1102).

If the mobile terminal 100 is in a communication state with the another party's terminal, the controller 130 controls the communication unit 120 to transmit and receive a sound signal of communication (S1104).

In order for the user to transmit his own feeling to another party or to feedback a vibration through a character, the controller 130 determines whether a hot-key is input by the user while the user performs communication with the another party (S1106). In this case, the hot-key may be displayed on the touch device 110 of the mobile terminal 100 or be separately provided at the side of the mobile terminal 100.

If the hot-key is input by user, the controller 130 controls to display a character feeling corresponding to the hot-key on the touch device 110 (S1108). In this case, the controller 130 controls to transmit a character feeling corresponding to the hot-key to the another party's terminal.

Figure 21:
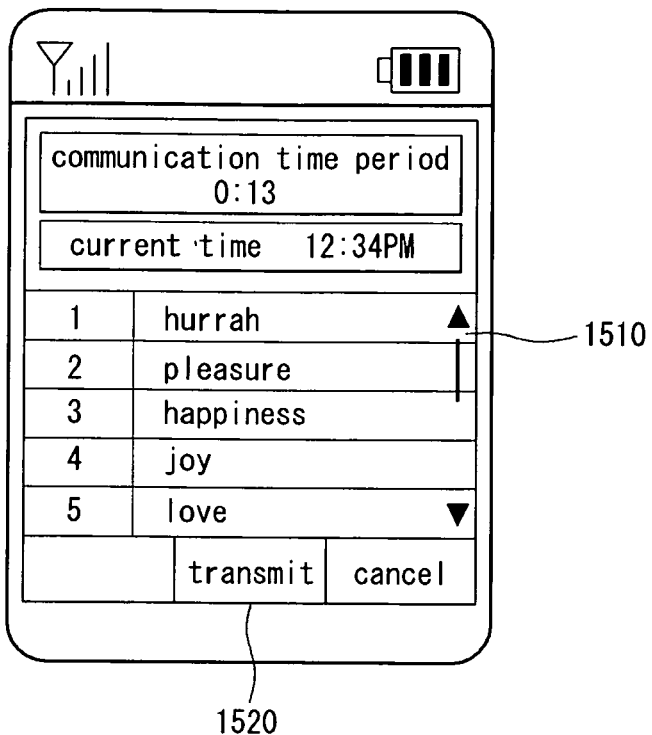
FIG. 21 illustrates a screen for setting another character feeling when transmitting a character feeling to another party's terminal.

When the user checks a character feeling displayed on the touch device 110 and intends to change the character feeling to another character feeling, the controller 130 determines whether another character feeling is set (1510) through a character feeling menu displayed on the touch device 110 (S1110), as shown in FIG. 21. FIG. 21 illustrates a screen for setting another character feeling when transmitting a character feeling to another party's terminal.

The controller 130 controls to display a character feeling newly set by the user on the touch device 110 (S1112). In this case, the controller 130 controls to transmit the newly set character feeling to the another party's terminal by inputting a transmission button 1520, as shown in FIG. 21.

The controller 130 controls the output unit 140 to output a vibration corresponding to a vibration output form corresponding to a hot-key, or the communication unit 120 to transmit a vibration output instruction corresponding to the hot-key to the another party's terminal (S1114).

If no input for changing to another character feeling exists at step S1110 after displaying a character feeling corresponding to the hot-key on the touch device 110, the controller 130 controls to output a vibration corresponding to the hot-key or to transmit the vibration to the another party's terminal (S1114).

Figure 12:
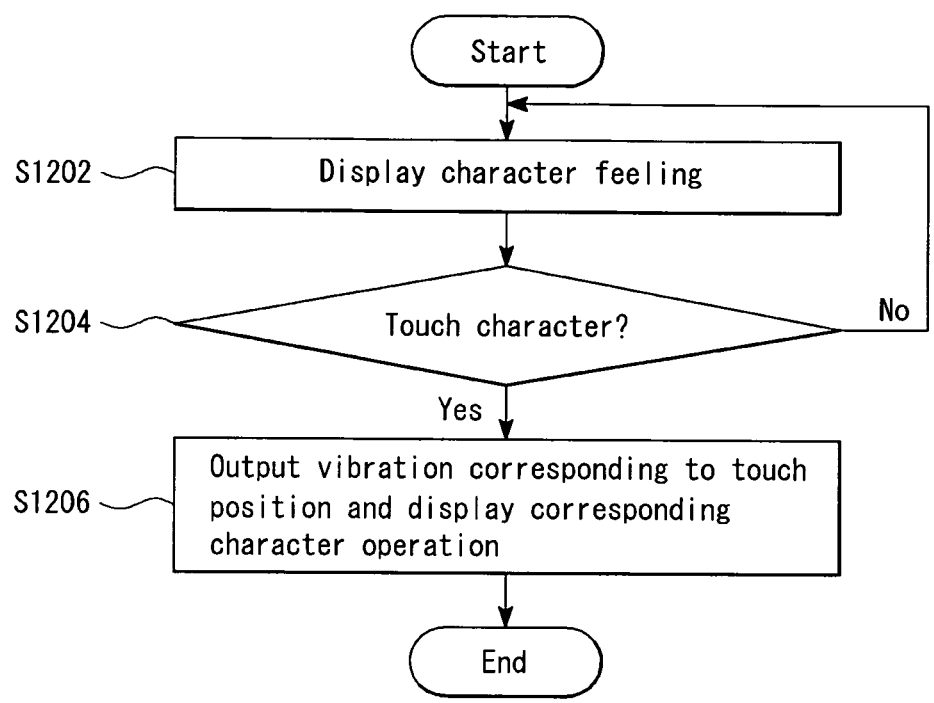
FIG. 12 is a flowchart illustrating a method of controlling a terminal in another implementation of this document.

FIG. 12 is a flowchart illustrating a method of controlling a terminal in another implementation of this document.

Referring to FIG. 12, in another implementation of this document, in a state where a character feeling is displayed, when a character is touched by the user, a character vibration is output.

The controller 130 controls to display a character feeling on the touch device 110 according to a use pattern of the terminal (S1202), as shown in FIG. 21.

Figure 22:
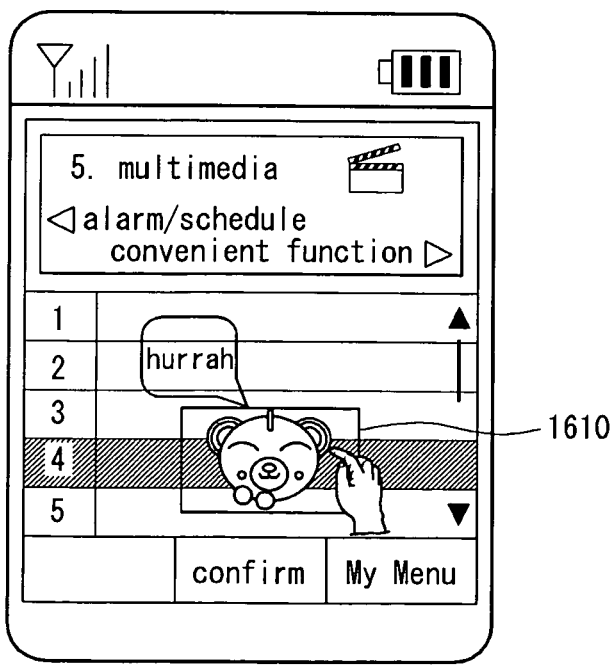
FIG. 22 illustrates a character vibration output when a user touches a character feeling displayed on a screen.

FIG. 22 illustrates a character vibration output when a user touches a character feeling displayed on a screen.

The controller 130 determines whether the user touches and inputs a character displayed on the touch device 110 by his finger (S1204), as shown in FIG. 22.

If the user touches and inputs a character displayed on the touch device 110, the controller 130 controls the output unit 140 to output a vibration corresponding to a touch position of the character and to display the corresponding character operation on the touch device 110 (S1206).

For example, when the user touches a character head displayed on the touch device 110, the controller 130 controls the output unit 140 to output a vibration having the output form shown in FIG. 17. The vibration output form shown in FIG. 17 lowers vibration strength for a predetermined section while outputting a vibration in predetermined strength 1110 and outputs a vibration in strength 1120 higher than previous predetermined strength after the predetermined section. The controller 130 controls to transmit a vibration output instruction having the output form shown in FIG. 17 to the another party's terminal.

Further, when a character tail is touched by the user, the controller 130 controls to display a character operation wagging its tail on the touch device 110.

When a predetermined portion of the character is touched by the user, the controller 130 controls to display a character operation corresponding to the touched portion, to output a vibration corresponding to the touched portion, and to transmit the vibration to the another party's terminal.

As described above, in this document, in a character having a shape or an operation changing according to a user manipulation, by matching a character operation to a use pattern of a mobile terminal, a terminal and a method of controlling the terminal that can display an operation or a feeling of a character and output a vibration according to the use pattern of the terminal can be realized.

As described above, in this document, while performing real-time communication with another party, a user operation can be transmitted to another party's terminal. Further, after the user operation is transmitted to the another party's terminal, the another party's operation can be fed back from the another party's terminal.

Other features will be apparent from the description and drawings, and from the claims.

What is claimed is:

1. A method of controlling a terminal, the method comprising:
receiving a first touch input on a screen through a touch device of a first terminal while performing real-time communication with a second terminal;
transmitting first data corresponding to the first touch input to the second terminal;
receiving second data corresponding to a second touch input from the second terminal, when the second touch input is performed on a screen through a touch device of the second terminal; and
outputting a vibration corresponding to the received second data through an output unit of the first terminal,
wherein the first touch input comprises a vertical or horizontal dragging operation on the screen of the first terminal,
wherein the first data transmitted to the second terminal includes an instruction for instructing the second terminal to shake the screen of the second terminal vertically or horizontally according to the vertical or horizontal dragging operation, respectively, and
wherein the first data includes a vibration instruction for instructing the second terminal to output a vibration.

2. The method of claim 1, wherein the real-time communication comprises using a messenger service to communicate with the second terminal, and the first touch input is received on at least one of a dialogue window, a picture, and a character on the screen of the first terminal.

3. The method of claim 1, wherein the real-time communication comprises a video call to the second terminal, and the first touch input is received on a portion of an image of a party using the second terminal on the screen of the first terminal.

4. The method of claim 1, wherein the first data transmitted to the second terminal includes instructions for instructing the second terminal to output one of a sound and a light corresponding to the first touch input.

5. The method of claim 1, wherein the received second data further includes instructions for instructing the first terminal to output one of a sound and a light corresponding to the second touch input of the second terminal or to shake the screen of the first terminal vertically or horizontally according to a vertical or horizontal touching and dragging operation on the second terminal, respectively.

6. The method of claim 1, wherein the second touch input is performed on an indicator displayed on the screen of the second terminal, and
wherein the indicator is displayed according to a position of an area in which the first touch input is received on the screen of the first terminal.

7. The method of claim 1, wherein the vibration instruction comprises a strength data of the vibration.

8. The method of claim 1, further comprising:
providing a menu option allowing a user to set a vibration effect the second terminal is to output upon receiving the transmitted vibration instructions, and to individually set a vibration output form that changes a strength of the vibration over a period of time for the set vibration effect.

9. A method of controlling a terminal, the method comprising:
receiving, via a second terminal, a first data from a first terminal while performing real-time communication with the first terminal, wherein the first data corresponds to a first touch input performed on a screen through a touch device of the first terminal;

outputting a vibration corresponding to the received first data through an output unit of the second terminal;

shaking a screen of the second terminal according to the received first data;

sensing a second touch input performed on a screen through a touch device of the second terminal; and transmitting a second data corresponding to the second touch input to the first terminal, wherein the received first data includes a vibration instruction for instructing the second terminal to output a vibration, wherein the first touch input comprises a vertical or horizontal dragging operation on the screen of the first terminal, wherein the received first data includes an instruction for instructing the second terminal to shake the screen of the second terminal vertically or horizontally according to the vertical or horizontal dragging operation, respectively, and wherein the second data includes a vibration instruction for instructing the first terminal to output a vibration.

10. The method of claim 9, wherein the second data further includes instruction for instructing the first terminal to emit a sound, or to emit light.

11. The method of claim 9, wherein the real time communication comprises a video call or a messenger service operation.

12. The method of claim 9, wherein the first touch input data received on the screen of the first terminal corresponds to a touching operation on the first terminal in which a predetermined area on a screen of the first terminal is touched while performing the real-time communication.

13. A mobile terminal, comprising:

an output unit;

a touch device;

a communication control unit configured to perform real-time communication with a second terminal; and a controller configured to:

receive a first touch input on a screen through the touch device while performing the real-time communication with the second terminal;

transmit first data corresponding to the first touch input to the second terminal;

receive a second data corresponding to a second touch input from the second terminal, when the second touch input is performed on a screen through a touch device of the second terminal; and output a vibration corresponding to the received second data through the output unit, wherein the first touch input comprises a vertical or horizontal dragging operation on the screen of the terminal, wherein the first data transmitted to the second terminal includes an instruction for instructing the second terminal to shake the screen of the second terminal vertically or horizontally accordingly to the vertical or horizontal dragging operation, respectively, and wherein the first data includes a vibration instruction for instructing the second terminal to output a vibration.

14. The mobile terminal of claim 13, wherein the real-time communication comprises using a messenger service to communicate with the second terminal, and the first touch input is received on at least one of a dialogue window, a picture, and a character on the screen of the terminal.

15. The mobile terminal of claim 13, wherein the real-time communication comprises a video call to the second terminal, and the first touch input is received on a portion of an image of a party using the second terminal on the screen of the terminal.

16. The mobile terminal of claim 13, wherein the first data transmitted to the second terminal includes instructions for instructing the second terminal to output one of a sound and a light corresponding to the first touch input.

17. The mobile terminal of claim 13, wherein the second data further includes instructions for instruction the terminal to emit a sound, or to emit light.

18. The mobile terminal of claim 13, wherein the real time communication comprises a video call or a messenger service operation.

\* \* \* \* \*